United States Patent Office 3,093,618
Patented June 11, 1963

3,093,618
POLYAMIDES FROM BETA-AMINO CARBOXYLIC ACIDS
Roderich Graf, Hofheim, Taunus, Paul Schlack, Frankfurt am Main, and Gerhard Lohaus, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed June 9, 1959, Ser. No. 819,007
Claims priority, application Germany June 14, 1958
26 Claims. (Cl. 260—78)

The present invention relates to a process for the manufacture of polymeric materials.

It is known to polymerize lactams carrying no substituent at the nitrogen atom and containing at least seven ring members in the presence of ring-splitting substances which generally have an acylating action or can be acylated and which contain active hydrogen by heating at a polyamide-forming temperature, i.e. at a temperature above about 150° C., and preferably above 180° C.

This reaction which is often designated as "condensation polymerization" comes to a re-amidation following the addition to carbonyl and proceeds rather slowly. It could hitherto be only applied to lactams containing at least seven ring members; neither δ-valerolactam nor γ-butyrolactam could be reacted under these conditions to yield polyamides.

As regards β-lactams, it is known that the difficultly accessible β-propiolactam is converted into a turbid viscous mass when heated to a temperature above its melting point, i.e. to about 180° C. The reaction product described in literature obviously differs widely in its properties from the known high molecular polyamide of β-amino-propionic acid which has a very high melting point and is very difficultly soluble and which should have formed in the linear polymerization of β-propiolactam. Since substances which are derived from polymerizable lactams and which are alkylated at the carbon atom generally behave more unfavorably than the parent substances, the behavior of β-lactams containing alkyl groups could not be foreseen at all. The manufacture of polyamides of β-amino-carboxylic acids alkylated at the carbon atom, especially at the β-carbon atom, was particularly worth aspiring after since it was expected that by the introduction of substituents the workability of polyamides of β-aminocarboxylic acids would be improved.

The ionic polymerization which has first become known in the case of caprolactam where it takes place at a relatively high temperature at a very high speed and which is initiated by alkali metal lactamate, can be applied to α-pyrrolidone in which case it can be conducted at a relatively low temperature but this reaction is rather specific. The behavoir of β-lactams, particularly of alkylated β-lactams, in the presence of lactamates could, therefore, not be foreseen at all.

Testa and collaborators have found that when Bodroux's reaction is applied to α-phenyl-β-aminopropionic acid-ethyl ester a polymer forms in addition to lactam at elevated temperature; in that case, however, an ester is reacted with the use of a Grignard reagent with the formation of an amide group and the formation of a chain amide in addition to a cyclic amide is not surprising.

The present invention is concerned with a process for the direct polymerization of β-lactams containing at least 4 carbon atoms in the molecule.

The present invention provides a process for the manufacture of polyamides derived from β-aminocarboxylic acids containing at least 4 carbon atoms wherein β-lactams carrying hydrogen at the nitrogen atom and containing at least one hydrogen atom in the α-position are polymerized at an elevated temperature, if desired in the presence of a substance initiating the reaction, or wherein such β-lactams are maintained at the reaction temperature in the presence of lactamates of strong bases until polymerization occurs.

As starting materials for the process of the present invention the following β-lactams may, for example, be used: β-methyl-β-butyrolactam, β-methyl-β-valerolactam, β-methyl-β-caprolactam, β-ethyl-β-valerolactam, β-ethyl-β-caprolactam, β-δ,δ-trimethyl-β-caprolactam, α,β-dimethyl-β-butyrolactam, β,β-trimethylene-β-propiolactam, β,β-tetramethylene-β-propiolactam, β,β-pentamethylene-β-propiolactam, β-phenyl-propiolactam, β-(4-chlorophenyl)-propiolactam, β-(4-tolyl)-propiolactam, β-[4-ethylphenyl-]-β-propiolactam, β-[2,4-dimethylphenyl-]-β-propiolactam, dilactam of unsymmetrical structure obtained by double addition of carbonyl sulfochloride to dipentene and subsequent splitting off of the chlorosulfonyl radicals, and dilactam of symmetrical structure obtained from dimethylallyl and carbonyl sulfochloride.

Any desired substituents may be used for the β-lactams, provided these substituents are free from groups containing active hydrogen which would participate in the reaction. There are preferably used monovalent saturated aliphatic or cycloaliphatic hydrocarbon radicals, such as methyl, ethyl, propyl, isobutyl or cyclohexyl, or aromatic radicals, for example phenyl, tolyl or chlorophenyl. Monovalent β-lactams containing a total of 5 to 10 carbon atoms can be used with special advantage. Lactams containing more than 14 carbon atoms are less suitable since the melting points and softening points of the polymers obtained therefrom are too low for most purposes.

The β-lactams which are alkylated, and preferably dialkylated, in the β-position and contain hydrogen in the α-position and the β-lactams carrying an aryl substituent in the β-position and containing hydrogen in the α-position are not only easy to polymerize, though at very different speeds, but are also very easily accessible raw materials. They are obtained according to U.S. patent application Ser. No. 800,408 filed on March 19, 1959, by the addition of chlorosulfonyl isocyanate to alkylenes or vinyl benzenes with subsequent splitting off of the chlorosulfonyl group from the primary adduction product. Owing to their surprisingly good stability in the absence of catalysts, these lactams can be easily purified by distillation and/or recrystallization to yield products of the high degree of purity required for the manufacture of medium-polymeric to high-polymeric polyamides.

According to the present invention, the polymerization may be realized by a simple heating; it is, however, advantageously conducted in the presence of an accelerator or agent initiating the reaction.

Since the purely thermal polymerization generally takes a long time and does not always yield satisfactory results with particularly stable, and especially higher alkylated lactams, it is of advantage to proceed in the presence of reaction accelerators or agents initiating the reaction. Heating in the presence of amides already has a certain accelerating effect. In the case of β-methyl-β-butyrolactam which is preferably used because it is easily accessible, the following substances, for example, display an accelerating action, though only a relatively feeble one: dimethyl formamide, β,β-dimethyl-acrylic acid-amide, acetic acid-monomethylamide, α-pyrrolidone, benzoic acid-di-methylamide, benzoic acid-monomethylamide. The most efficient amides are primary amides, such as benzamide. More active initiators and accelerators for the polymerization of β-lactams substituted by alkyl groups and containing at least one hydrogen atom in the α-position are the following substances or types of substances:

(1) Water which is suitably added in a small amount only or formed from substances splitting off water at the reaction temperature; water-forming substances of this kind are, for example, lactone-forming oxyacids, thermally easily decomposing tertiary alcohols and glycols which, if necessary in the presence of an acid catalyst, readily form ethers; all these substances may be used, if desired, in combination with small amounts of specific accelerators, for example hydrogen halide, phosphoric acid, arylsulfonic acid, strongly acid salts, such as zinc chloride and zinc bromide.

(2) Mono- or polyvalent carboxylic acids, if desired in the presence of water, or anhydrides of such acids, for example lauric acid, stearic acid, montanic acid, adipic acid, sebacic acid, butane-1,2,4-tricarboxylic acid, butane-1,2,3,4-tetracarboxylic acid, benzoic acid, cinnamic acid, phthalic anhydride, ω-benzamino-heptanoic acid.

(3) Soluble non-crosslinked polycarboxylic acids of polymeric structure, such as polyacrylic acid, copolymers of acrylic acid, and other vinyl monomers, such as vinyl pyrrolidone or acrylic acid amide, copolymers of maleic anhydride or itaconic anhydride and other vinyl monomers, such as styrene, or low vinyl alkyl ethers or their hydrolyzation products; in this case, too, stronger acids, such as phosphoric acid, may be added as specific accelerators.

(4) Mono- or polyvalent amines, particularly primary amines, such as dodecylamine, hexamethylene diamine, dipropylene triamine, ω-piperidino-hexylamine, polyallyl-amine, particularly also in the form of their salts with a strong acid, for example a hydrogen halide or an organic sulfonic acid.

(5) Mono- or polyhydric alcohols, such as dodecyl alcohol, benzyl alcohol, hexamethylene glycol, if desired in the presence of an acid accelerator, such as phosphoric acid or zinc chloride; alcohols used per se generally have only a relatively weak action.

(6) Compounds or pairs of substances capable of splitting off water with linear polycondensation, such as polyamide-forming ω-aminocarboxylic acids and salts thereof, for example with hydrohalic acids, polyamide-forming salts from diprimary diamines, such as hexamethylene diamine and dicarboxylic acids, such as adipic acid or sebacic acid, or, finally, ω-hydroxycarboxylic acids capable of forming linear polycondensation products or polyester-forming combinations of dicarboxylic acids and glycols; this group also comprises linear polyamides, for example low-polymeric to high-polymeric polycaprolactam, polycondensation products of 11-amino-undecane acid, polyamide from β-methyl-adipic acid and hexamethylene diamine.

(7) Esters of carboxylic acids, such as phenyl acetate, oxalic acid diethyl ester, adipic acid-dimethyl ester, adipic acid-diethyl ester and terephthalic acid-bis-hydroxyethyl ester.

(8) Strong acids which do not oxidize, such as phosphoric acid and advantageously hydrogen halides, as well as strongly acid salts, such as zinc chloride, and borofluoride.

(9) Acid chlorides, such as acetyl chloride, benzoyl chloride, oxalyl chloride, adipic acid chloride; when highly reactive lactams are used, for example β-phenyl-propiolactam, the reaction temperature may be within the range of 40 to 60° C., whereas with lactams reacting more slowly, it may be advantageous to proceed at a temperature ranging from 90 to 130° C.

The accelerators are advantageously chosen in such a manner that a homogeneous solution or melt is formed before the reaction temperature is reached.

When as agents initiating the reaction there are used substances which already form linear polycondensation products when used alone, co-polycondensation products of β-aminocarboxylic acids are obtained which may be distinguished over β-lactam polymers of uniform structure by changed, and generally improved properties of solubility. To obtain particularly readily soluble copolyamides, combinations of two or more different β-lactams are advantageously used, as will be set forth hereinafter; in this case it is of advantage to use starting materials of similar reactivity.

The condensation polymerization according to the invention is generally carried out at a temperature within the range of about 150 to about 220° C., preferably at 155 to 185° C. Since the polymerizability of the β-lactams may vary widely depending on the substitution at the carbon atom, the working conditions must be adapted to the reactivity of the monomers, the efficiency of the accelerators and the thermostability of the polymers. It is, therefore, necessary to determine the optimum conditions of time and temperature for the individual lactams and mixtures thereof by simple serial tests. For a purely thermal polymerization relatively high temperatures are advantageously applied since the reaction is in this case probably initiated by a beginning decomposition. The relatively sensitive β-phenyl-propiolactam, used alone, is, for example, more reactive when heated than the more stable β-methyl-β-butyrolactam. Owing to the great differences in reactivity it is not possible to give exact data as regards the reaction time; the latter may vary, for example, between 1 and 24 hours.

When water or water-forming substance is used as initiator, it is of advantage to proceed in a first stage in a closed vessel in order to prevent premature volatilization of the initiator. The quantity in which the water or water-forming substance, for example γ-hydroxybutyric acid or a tertiary alcohol readily splitting off water, is added may vary within wide limits. Advantageously only a small amount, for example 1 to 5%, calculated as water, is added.

When other substances, particularly simple carboxylic acids or amines, especially primary amines which are preferably used in the form of their salts with, for example hydrogen halide, are used as initiators, it is not absolutely necessary to add water, such an addition being, however, suitable in most cases.

The use of free amines is in general less advantageous since in this case discoloration is, in general, unavoidable, even if the process is carried out in the absence of oxygen, whereas the use of water alone or of carboxylic acids generally leads to completely colorless or only slightly yellowish poymers. The same appies to aminocarboxylic acids which do not undergo splitting off of ammonia under the reaction conditions according to the invention.

The observation of the splitting off of ammonia may be important for the tolerable upper limit of the reaction temperature. When, for example, β-methyl-β-butyrolactam was polymerized in the presence of a small amount of ω-aminocaproic acid as initiator, almost no ammonia (less than 1 mol percent) was formed even when the reaction mixture was heated for 24 hours at 175° C. and a substantially colorless product was obtained, whereas at 200° C. a considerable amount of ammonia was set free with discoloration of the polyamide resin and in spite of these more severe reaction conditions the polymerization degree was not increased. It is, therefore, of advantage to proceed at the lowest possible temperature and prolong the reaction time instead of applying an elevated temperature and a shorter reaction time, which leads to losses of nitrogen owing to the splitting off of ammonia and involves further undesirable side reactions.

To avoid discoloration the reaction is advantageously carried out with the exclusion of oxygen under a protective gas such as nitrogen or carbon dioxide as is usual in polyamide chemistry, although the polyamides of β-aminocarboxylic acids are usualy less liable to undergo oxidation than typical fiber-forming polyamides with longer paraffin chains between the nitrogen and the carbonyl group.

Additional basic terminal groups may be introduced, for example to improve the tinctorial properties, by using as agents initiating the reaction primary-secondary or primary-tertiary di- and polyamides or their salts, for example N,N-dimethyl-1,3-propylene-diamine, di-1,3-propylene-triamine, N-methyl-di-γ-aminopropylamine and ω-piperidino-hexylamine.

Since the reaction is in general carried out in the melt or, generally less advantageously, in a more or less inert solvent, such as anisol, dichlorobenzene, phenol and butyrolactone, under relatively mild conditions, the process of the present invention is advantageously carried out with the use of lactams which, owing to the presence of substituents with more than 1 carbon atom, particularly higher alkyl radicals, yield linear polyamides of good solubility and/or moderately high melting point; there may also be used with advantage mixtures of β-lactams carrying different substituents or mixtures of β-lactams with the above-mentioned other polycondensation raw materials, particularly with aminocarboxylic acids containing at least 5 carbon atoms between the carboxyl and the amino group in which case it is not absolutely necessary that the amino group is terminally bound. Heterogeneous components, for example diamino acids and dicarboxylic acids, are advantageously added only in a minor quantity.

Especially suitable are mixtures of β-lactams which, when used alone, yield difficultly soluble polyamides, particularly of β-methyl-β-butyrolactam which can be easily obtained technically from isobutylene, with higher substituted β-lactams of similar reactivity, preferably β-methyl-β-caprolactam. Mixtures of these two lactams in which the latter component is present in an amount of 20 to 50% and more are soluble in numerous solvents. Combinations consisting to an extent of 40 to 50% of β-methyl-β-caprolactam yield completely transparent, highly elastic shaped bodies and coatings.

As compared with the usual fiber-forming linear polyamides, the reaction products obtained by the condensation polymerization process of the present invention generally have only relatively low to medium molecular weights. Higher polymeric resins of branched structure are obtained by using high molecular substances of polymeric structure as reaction initiators which are incorporated as branching components into the molecule in the polyamide formation as, for example, the above-mentioned polyvinyl carboxylic acids and their anhydrides. Analogous aminopolymers, particularly those containing primary amino groups, such as polyallylamine and polyamines obtained from polyvinyl alkyl ketones by an aminating reduction or more advantageously salts of such polyamines with strong acids, preferably hydrochloric acid, may also be used for the manufacture of high molecular branched polyamides from β-lactams. Such branched polyamides are especially suitable for subsequent reactions with acylating, amide-forming or alkylating agents, particularly with difunctional and polyfunctional crosslinking agents, for example di-isocyanates, di-epoxides, poly-epoxides, diamines or polyamines containing more than one nitrogen atom capable of being acylated.

According to the process of the present invention high molecular substances may also be prepared with the use or concomitant use of β-lactams containing two or more lactam rings of the above-mentioned kind. Such compounds can be obtained according to the aforesaid patent application from hydrocarbons containing at least 2 double bonds. Since in this case, at least with a higher content of such components, the resultant products are insoluble or not completely soluble, more or less crosslinked and at the most thermoplastic polymers, reactions of this kind are preferably used for the direct manufacture of shaped bodies or for applying or embedding polymers in statu nascendi to or in porous substrata, for example textiles, paper, wood and wood fiber compositions.

The products obtained by the process of the invention, particularly the copolyamides, generally do not have the crystalline habit of the usual fiber-forming polyamides but the character of synthetic resins whose solubility in organic solvents increases with the length of the alkyl radicals. Polyamides which, for example, are unsymmetrically substituted by alkyl radicals containing more than 2 carbon atoms are under certain conditions even soluble in saturated hydrocarbons, such as cyclohexane. Accordingly they are preferably used as raw materials for lacquers or varnishes. They may also be used as intermediate products for the manufacture of high molecular polycondensation products which, if desired, may be branched or cross-linked.

Suitable branching and cross-linking agents are, for example, bivalent or polyvalent isocyanates or substances splitting off such isocyanates in the hot, polyvalent epoxides or epoxide-isocyanates.

As far as the new polyamides contain terminal amino groups, they can be dyed full shades with dyestuffs containing acid groups. With triketohydrindene hydrate they only react positively when the terminal amino group is not present in a tertiary bond; this is the case, for example, with polyamides containing terminal groups of β-amino-hydrocinnamic acid.

Contrary to the condensation polymerization, the polymerization catalyzed by lactamates of strong bases proceeds at a high rate already at a substantially lower temperature, and with the use of certain lactams it leads to polyamides of a very high molecular weight, for example a molecular weight of 200,000 and even more.

The quantity of lactamate or lactamate-forming substances necessary for the reaction may vary within relatively wide limits, for example between 0.01 and 20 mol percent, depending on the reactivity of the lactam to be polymerized and the desired degree of polymerization which generally decreases with an increasing addition of lactamate. In general, the lactamate is added in an amount within the range of 0.1 to 5 mol percent, the lower values of this range being mainly used for rapidly polymerizing lactams, for example of the type of β-phenyl-propiolactam.

The process of the lactamate catalyzed polymerization is advantageously conducted in the complete absence of water or water-forming substances if it is desired to obtain products having as high as possible a molecular weight. Since, however, this modification of the process of the invention is not limited to the formation of very high molecular substances, the presence of water or other compounds with exchangeable hydrogen, such as alcohols, mercaptans, amines and phenols, shall not be excluded. Substances of this kind enable the control of the average polymerization degree. As substances of this kind there may be mentioned, in addition to water, methanol, ethanol, dodecyl alcohol, hexamethylene glycol, 3-dimethylamino-propanol-1, methylmercaptan, benzylmercaptan, n-butylamine, 3-aminopropanol, hexamethylenediamine, piperidine, aniline, trichloraniline and m-aminophenol. The retarding effect of these compounds which may be added, for example, in an amount of ½₀₀ mol to ⅒ mol or more if desired, differs and depends considerably on the reactivity of the lactam used in a given case.

As agents initiating the lactamate catalyzed polymerization any desired salts of the lactams to be polymerized with strong bases (lactamates), especially those of alkali metals, may be used. The β-lactamate anions initiating the reaction need not be preformed but may be formed with the same good result in the dissolved, liquefied or dispersed β-lactams to be polymerized, for example by the addition of alkali metal compounds of other amides, advantageously other lactams, such as α-pyrrolidone sodium, piperidone sodium and caprolactam sodium; the ions of the polymerizable β-lactams, which ions initiate the reaction, enter immediately in an equilibrium. As substances forming lactamates alkali metal compounds of non-cyclic amides may also be used, for example the sodium compound of N-methyl-acetamide. Further suitable lactamate-forming substances are alkali metals, alkaline earth metals, alkali metal hydrides, alkaline earth metal hydrides, such as lithium, sodium, calcium or magnesium hydride, alcoholates, such as sodium methylate, sodium-sec.-butylate, sodium isobutylate or potassium-tert.-butylate, organometal compounds, such as phenyl-magnesium bromide, cyclopentadiene potassium and indene sodium. Concentrated aqueous alkali metal hydroxide solutions, alkali metal carbonates, alkali metal sulfhydrates, alkali metal cyanides and other strongly alkaline salts may also be used as substances forming lactamate, especially when the rate of polymerization is very high as, for example, in the case of β-aryl-propiolactams. Because of the hydrolysis equilibrium, a reaction mixture containing small amounts of water has to be heated for a longer period and/or at a higher temperature than an anhydrous lactamate. When a relatively weak base, such as sodium carbonate, is used in a heterogeneous system, the reaction proceeds particularly slowly and the yield is generally smaller.

Instead of strong inorganic bases there may finally be used as substances forming β-lactamates strong organic bases, for example butyl-tri-methyl-ammonium hydroxide, benzyl-tri-methyl-ammonium hydroxide and dodecyl-tri-methyl-ammonium hydroxide. The good solubility of the lactamates of these bases in β-lactams may be of great advantage. Salts of quaternary bases with readily volatile acids, for example carbonates or cyanides of quaternary bases, may be used as substances forming lactamate at elevated temperatures.

The reaction generally proceeds in an anhydrous medium at a surprisingly low temperature, for example between room temperature and 100° C. β-Aryl-propiolactams are especially reactive. For example, the polymerization of β-phenyl-propiolactam by the addition of 1 mol percent of pyrrolidone sodium can be carried out at room temperature within a very short time. Thus, lactams of this kind may be polymerized at an even lower temperature.

Higher temperatures, for example 180° C., may, however, also be applied, especially when polymers of low to medium molecular weight are to be obtained, but the temperature and the period of heating have to be adjusted so as to prevent undesired decomposition of the polyamide. In order to obtain an extremely high polymerization degree, it is in general of advantage to proceed at a fairly low temperature.

Since the polyamides obtained by the process of the present invention often melt at a high temperature with decomposition, it is generally of advantage to conduct the polymerization in the presence of a diluent (solvent or dispersing agent) for β-lactams. Inert diluents suitable in a given case are, for example, cyclohexane, methylene chloride, benzene, toluene, chlorobenzene, dichlorobenzene, anisol, dioxan and advantageously highly polar solvents, for example N-methyl-acetamide, methyl-ethyl-sulfone, tetra-methylene-sulfone, dimethyl sulfoxide, methyl-ethyl-sulfoxide, tetramethylene sulfoxide, dimethyl formamide, N-methyl-morpholine and dimethyl aniline. Even aniline may be used as solvent when readily reactive β-lactams, such as β-phenyl-propiolactam, are used, especially when only a medium polymerization degree is to be obtained. Dimethyl sulfoxide is particularly suitable since it dissolves not only β-lactams but, in the hot, also many difficultly soluble polyamides, at least as long as the polymerization degree is not yet very high.

Whereas primary alcohols are drastic polymerization inhibitors, secondary and especially tertiary alcohols are considerably more inert so that they can be used as solvents in the polymerization, especially when easily polymerizable lactams are used. For example, β-phenyl-propiolactam is almost quantatively polymerized within 1 hour in boiling tertiary butanol in the presence of 1% of sodium-tert.-butylate. In secondary butanol the polymerization proceeds more slowly.

It is of great practical importance that the polymerization can be conducted in a solvent; this method of proceeding is especially advantageous when the reaction products remain dissolved. The resulting solutions can be worked up without difficulty, if desired after neutralization of the alkali, to yield, for example, fibers, films or coatings. This is particularly remarkable since this mode of proceeding is not applicable to polymerizable lactams having a greater number of ring members, for example α-pyrrolidone.

Instead of polymerizing in a homogeneous system liquid or molten lactams or, if desired, lactams which have been liquefied at a temperature below the melting point by the addition of small amounts of solvent or dissolved in a relatively large quantity of solvent, it is also possible, as already mentioned above, to polymerize dispersions of the liquid or liquefied β-lactams in inert diluents, such as mineral oils, by means of lactamates.

It is of advantage, especially when slowly reacting lactams are used, thoroughly to free solvents and lactams from traces of water prior to the polymerization. This may be done, for example, by azeotropic distillation, heating in vacuo for a prolonged time or by passing through an inert gas, such as nitrogen, preferably under reduced pressure. If additional regulating substances are necessary these have to be added in exactly measured portions.

As far as the reaction mixture remains liquid or at least gel-like during the reaction, the polymerization may be conducted in a particularly simple way in a continuous manner, for example in a screw machine which enables a reliable convenient control of the temperature by heating or cooling. The possibility of controlling the temperature is of great importance since, when carried out on an industrial scale, the reaction may set in suddenly with the evolution of much heat so that the temperature may exceed by far its tolerable upper limit. The reaction product may then be worked up by being extruded from these apparatus in the form of bodies having large surface areas, for example filaments or bands, into a precipitating liquid, such as water, methanol or acetone, the residual solvent being removed from the shaped polymeric material in known manner by extraction or evaporation. When the process is carried out discontinuously, the residual solvent may be eliminated by a stirring or kneading device.

The aforesaid polyamides obtained from unitary β-lactams are distinguished, as far as they carry low alkyl groups, preferably methyl groups, or aryl radicals as substituents in the β-position, by high decomposition points and a remarkably good stability in organic solvents. In general, they dissolve only in typical polyamide solvents, such as concentrated sulfuric acid, formic acid, dichloroacetic acid, trifluoroacetic acid, difluorochloroacetic acid or trifluorethanol, and in phenols. Some of them dissolve in hot high-boiling solvents of a high dielectric constant, particularly in dimethyl sulfoxide.

More readily soluble polyamides, under certain circumstances even those which dissolve in hydrocarbons, are also obtained by the lactamate polymerization when lactams are used which carry higher alkyl radicals, for example the n-propyl or isobutyl radical, in the β-position or by copolymerizing different β-lactams carrying hydrogen at the α-carbon atom, the components suitably having similar speeds of polymerization. It has surprisingly been found that it is not only possible to ionically copolymerize different β-lactams with one another but also mixtures of β-lactams with other polymerizable lactams having a greater number of ring members, advantageously mixtures of β-lactams with α-pyrrolidone. These copolymers which are characterized by irregular distances between the amido groups are generally well soluble in organic solvents. For example, the copolyamide obtained from 80 parts of β-methyl-β-butyrolactam and 20 parts of α-pyrrolidone is easily dissolved by mixtures of methanol and chloroform. By polymerizing monomers in other proportions, for example 60 parts of β-methyl- β-butyrolactam and 40 parts of α-pyrrolidone, copolymers are obtained which are easily soluble even in alcohols. Solutions of this kind can be worked up into films, coatings and other shaped articles.

When lactams having a greater number of ring members, particularly α-pyrrolidone, are used for the copolymerization, the addition of a solvent is advantageously avoided; at least such an addition should be restricted as far as possible.

The polymerization may also be carried out on a substratum or base. For this purpose, the substrata, for example textiles, are impregnated with solutions of the lactams which already contain a lactamate or lactamate-forming substance, for example the carbonate of a quaternary ammonium base; the solvent, for example water or methanol, is then evaporated whereupon polymerization sets in after formation of the lactamate. Solutions in alcohol, such as methanol or ethanol, are stable since the presence of a relatively large amount of alcohol obviously prevents the formation of lactamate.

Accordingly, it is also possible to stabilize lactam solutions in other inert solvents, for example dimethyl sulfoxide or benzene hydrocarbons, in the presence of lactamate-forming substances by the addition of a volatile alcohol. Only after the alcohol, for example methanol, has been evaporated or inactivated by a chemical treatment, such as an acylation, for example with an isocyanate, does reaction set in.

The polyamides of β-aminocarboxylic acids obtained by the process of the present invention have a wide range of application according to the starting material used, the co-components which may be employed and the degree of polymerization.

Highly polymeric and high-melting substances may, for example, be used for the manufacture of filaments or films capable of being oriented. According to the physical properties of the products, all known processes for the working up into filaments may be used, for example spinning from the melt, dry spinning or wet spinning by means of spinning pumps. Thicker filaments, foils and bands may be prepared in known manner by extrusion.

As already mentioned above, highly polymeric polyamides of β-lactams may be also worked up into tridimensional shaped bodies, for example by pressing, injection molding or transfer molding. Products of medium molecular weight may be worked up, depending on their solubility, either alone or with an addition of a plasticizer or resin, to yield lacquers and varnishes. Products of low to medium molecular weight finally constitute valuable intermediate products for the manufacture of higher condensated substances of linear or branched structure; to increase the molecular weight any desired di- or polyfunctional linking or cross-linking agents for polyamides may be used, for example di- and polyvalent isocyanates or substances splitting off such isocyanates in the hot, polyvalent epoxides or epoxide isocyanates.

The following examples serve to illustrate the invention but they are not intended to limit it thereto:

*Example 1*

10 g. of β-methyl-β-caprolactam were heated for 18 hours at 175° C. in the presence of 0.5 g. of ω-amino-caprylic acid, while introducing nitrogen. The beginning of the polymerization was already indicated after about 1 hour by a great increase of the viscosity of the liquid. Finally, a colorless resin which was hard and brittle at room temperature was obtained. It had a relative viscosity of 1.18. The product was well soluble in many organic solvents.

A batch which was heated under the same conditions for 18 hours at 175° C. and subsequently for 4 hours at 210° C. yielded a slightly yellowish transprent product of a relative viscosity of 1.20, the other properties of the product corresponding to those of the product described above.

On heating the resins obtained according to this example began to soften at a temperature of about 110° C. and above.

*Example 2*

10 g. of β-methyl-β-butyrolactam and 0.3 g. of ammonium acetate were heated for 10 hours at 175° C. under nitrogen. Already after about 1 hour the whole batch solidified and became opaque. The polyamide which was only slightly yellow had a relative viscosity of 1.10. It was insoluble in most organic solvents and melted at about 260° C. with decomposition.

*Example 3*

6 g. of β-methyl-β-butyrolactam and 0.3 g. of ω-amino-caprylic acid were heated for 16 hours at 175° C. in 30 cc. of o-dichlorobenzene. After about 3 hours the polymer began to separate out. By filtering with suction, repeated boiling with acetone and drying in vacuo 6.2 g. of polyamide having a relative viscosity of 1.18 were isolated in the form of a colorless powder. The product was insoluble in the usual organic solvents but soluble in hot dimethyl formamide and dimethyl sulfoxide. It melted at about 270° C. with decomposition.

*Example 4*

3 g. of β-methyl-β-butyrolactam, 3 g. of β-methyl-β-caprolactam and 0.1 g. of water were heated for 18 hours at 175° C. in a sealed tube. The tube was then partially removed from the bath and the water as well as relatively small quantities of unreacted monomeric lactam were distilled into the bent end of the tube. The whole was heated for a further 5 hours at 175° C. About 5 g. of a completely colorless, transparent polymer was obtained which had a relative viscosity of 1.6 and was well soluble in numerous organic solvents, for example methylene chloride and methanol. These solutions could be cast to yield hard and well adhering coatings. The polyamide began to soften at about 120 to 130° C.

A polymer prepared from the same components at 190° C. was much more brittle and had a relative viscosity of only 1.3. When the polymerization was carried out at 160° C., a considerably longer reaction time was needed (both periods amounting to a total of about 60 hours), the resultant product had, however, a relative viscosity of 1.72, i.e. a higher relative viscosity than the product prepared at 175° C.

The three polymers produced did not differ substantially as regards their solubility.

*Example 5*

7 g. of β-methyl-β-butyrolactam, 3 g. of β-methyl-β-caprolactam and 0.5 g. of ω-amino-caprylic acid were heated at 180° C. The relative viscosity of the polyamide was 1.24 after a reaction time of 2 hours and 1.28 after 24 hours. The prolonged reaction time had obviously no influence on the properties of solubility and the melting properties of the product, while the color was only slightly influenced. The polyamide gave no positive triketohydrindene hydrate reaction.

*Example 6*

6 g. of β-methyl-β-butyrolactam, 2 g. of β-methyl-β-caprolactam and 0.2 g. of adipic acid were heated for 8 hours at 170° C. A colorless polymer was obtained. The product had a relative viscosity of 1.25 and began to soften at about 170° C. It was soluble in dimethylformamide, dimethyl sulfoxide and typical solvents for polyamides, such as phenols, formic acid and trifluoroethanol.

*Example 7*

0.5 g. of the copolymer obtained from 1 mol of maleic anhydride and 1 mol of styrene was dissolved in a mixture of 6 g. of β-methyl-β-butyrolactam and 2 g. of β- methyl-β-caprolactam and the whole was heated for 10 hours at 175° C., while dry, purified nitrogen was slowly introduced. An almost colorless resin was obtained which was very thickly liquid at that temperature and brittle at room temperature. It had a relative viscosity of 4.3. It was well soluble in methanol and swelled in methylene chloride. Coatings of this polymer which had been heated to 100° C. in the presence of a small amount of hexamethylene diamine were insoluble and swelled only slightly in methanol. A similar effect was produced by other polyvalent amines containing nitrogen capable of being acylated, for example dipropylenetriamine.

*Example 8*

3 g. of β-phenyl-propiolactam and 3 g. of β-methyl-β-caprolactam were heated for 15 hours at 180° C. together with 0.3 g. of ω-amino-dodecylic acid. A polyamide having a relative viscosity of 1.24 was obtained. It had a softening temperature of about 160° C. The product was soluble in hot dimethyl sulfoxide.

*Example 9*

10 g. of β-methyl-β-butyrolactam and 0.2 g. of hexamethylene diamine were heated for 18 hours at 200° C. The resulting polyamide was slightly colored and had the properties of a very hard wax. The product had a relative viscosity of 1.32 and a softening point of about 250° C. It was soluble only in typical polyamide solvents.

*Example 10*

10 g. of β-methyl-β-butyrolactam and 0.3 g. of dodecylamine hydrochloride were heated for 18 hours at 180° C. A yellow polyamide was obtained which had a softening temperature of about 250° C. and a relative viscosity of 1.29.

*Example 11*

5 g. of β-ethyl-β-valerolactam and 0.05 g. of phosphoric acid of 85% strength were heated for 3 hours at 180° C. After a reaction time of about 30 minutes the product solidified. A slightly yellow polyamide was obtained. The product had a relative viscosity of 1.10 and began to soften at about 245° C. Its properties of solubility were similar to those of the polymer of β-methyl-β-butyrolactam.

*Example 12*

5 g. of α,β-dimethyl-β-butyrolactam and 0.2 g. of the salt obtained from adipic acid and hexamethylene diamine were heated for 2 hours at 180° C. A slightly yellow transparent resin was obtained which softened at about 150° C. and had a relative viscosity of 1.15. The product was soluble in numerous organic solvents, for example methanol, methylene chloride and ethyl acetate.

*Example 13*

2 g. of β,δ,δ-trimethylβ-caprolactam and 0.1 g. of ω-amino-caprylic acid were heated for 24 hours at 180° C. After about 6 to 7 hours a marked increase of the viscosity was observed. The polymer began to soften at about 80° C. It had a relative viscosity of 1.10 and was soluble in numerous organic solvents.

*Example 14*

5 g. of β-methyl-β-butyrolactam and 0.3 g. of benzamide were heated for 16 hours at 180° C. The product was then extracted with acetone in order to remove monomeric lactam. The polyamide was obtained in a yield of 70%; it had a relative viscosity of 1.9. When the process was carried out with the use of 0.3 g. of monomethyl benzamide, while otherwise applying the same conditions, the yield amounted to 30% and the relative viscosity was 1.8; when dimethyl benzamide was used, the yield amounted to 30% and the relative viscosity to 1.24.

*Example 15*

5 g. of β-methyl-β-butyrolactam and 0.25 g. of β,β-dimethyl-acrylamide were heated for 20 hours at 180° C. After about 15 hours the whole mixture solidified. The product was repeatedly extracted with hot acetone. 3 g. of an insoluble polyamide having a relative viscosity of 2.0 were obtained.

*Example 16*

5 g. of β-methyl-β-butyrolactam and 0.25 g. of dodecyl alcohol were heated for 40 hours at 175° C. The yield of polyamide insoluble in acetone was 25%, its relative viscosity amounting to 1.7.

*Example 17*

5 g. of β-methyl-β-butyrolactam and 0.15 g. of m-cresol were heated for 15 hours at 180° C. After extraction with acetone a polyamide having a relative viscosity of 1.6 was obtained in a yield of 50%.

*Example 18*

3.75 g. of β-methyl-β-butyrolactam, 1.25 g. of montanic acid and 3 cc. of o-dichlorobenzene were heated for 3 hours at 180° C. To remove free acid the precipitated polyamide was boiled three times with benzene. The yield of polyamide amounted to 4.6 g. The relative viscosity was 1.16.

*Example 19*

By heating 5 g. of β-methyl-β-butyrolactam and 0.25 g. of phthalic anhydride for 2 hours at 180° C. a solid polyamide having a relative viscosity of 1.2 was obtained.

*Example 20*

5 g. of β-methyl-β-butyrolactam and 1% by weight of anhydrous hydrogen chloride were heated for 5 hours at 175° C. After 1 hour the mixture solidified. The relative viscosity of the brown polyamide was 1.15. The product contained only 5% of substance soluble in acetone.

*Example 21*

5 g. of β-methyl-β-butyrolactam were heated for 6 hours at 180° C. in the presence of 0.15 g. of anhydrous zinc bromide. The solid polymer had a yellowish brown coloration. Its relative viscosity was 1.18.

*Example 22*

5 g. of β-methyl-β-butyrolactam and 0.25 g. of diethyl adipate were heated for 28 hours at a temperature within the range of 175 to 180° C. The portion which was insoluble in hot acetone amounted to about 30% of the total batch and had a relative viscosity of 2.5. It was only partially soluble in trifluorethanol but yielded concentrated solutions in formic acid from which coating films could be cast.

*Example 23*

1.8 g. of β-methyl-β-butyrolactam, 1.2 g. of pulverized poly-ε-caprolactam and 0.05 g. of water were heated at 175° C. At a temperature of about 130 to 140° C. and above a clear homogeneous solution formed which, however, began to solidify after 5 hours at the reaction temperature. Heating was continued for a further 15 hours and the water was subsequently distilled off at the same temperature within several hours. A unitary slightly yellow polyamide of a relative viscosity of 1.6 was obtained. The product began to soften at about 200° C.

*Example 24*

1.5 g. of β-methyl-β-butyrolactam, 1.05 g. of β-methyl-β-caprolactam and 0.45 g. of the bis-lactam obtained from dipentene were heated in the presence of 0.05 g. of water in a sealed tube for 16 hours at a temperature within the range of 175 to 180° C. In the course of a further 9 hours during which the temperature was maintained at that level, the water was distilled into the bent end of the tube. The solid polymer was soluble in methanol; however, in contrast to comparison products obtained from a mixture of the two mono-lactams only, it was insoluble in methylene chloride. Nor could a completely clear solution in concentrated sulfuric acid be obtained.

*Example 25*

5 g. of β-methyl-β-butyrolactam and 0.25 g. of 3.5-dichloroaniline-hydrochloride were heated for 4 hours at 170° C. Only 5% of the resulting solid polymer could be extracted with hot acetone. The product had a relative viscosity of 1.21. After boiling with water it contained 1.5% of chlorine, that is to say about 90% of the catalyst had been incorporated into the polyamide.

*Example 26*

3 g. of β-phenyl-propiolactam were heated for 2 hours at 90° C. in 8 cc. of dry anisol in the presence of 0.06 g. of adipic acid dichloride. After a few minutes the solution became turbid and a solid polymer then began to separate out. Within about 30 minutes the whole mass became immovable. The polymer was comminuted and boiled four times with 60 cc. of acetone each in order to remove solvent and monomer which had not reacted. The product was subsequently dried at 75° C. in vacuo. The yield was 2.4 g., the relative viscosity 1.13.

When a batch containing dioxan as solvent and otherwise having the same composition was heated for 15 hours at 50° C., 1.9 g. of a polymer of a relative viscosity of 1.15 were obtained. On heating the polymers began to discolor at a temperature of about 300° C. and decomposed at about 320° C.

*Example 27*

5 g. of β-methyl-β-butyrolactam and 0.1 g. of adipic acid dichloride were heated for 15 hours at 90° C. in 5 cc. of anisol. The whole batch solidified within some hours to form a gel-like mass. The polymer was isolated by comminution and repeated boiling with acetone. The yield amounted to 1.2 g. and the relative viscosity was 1.13. The polyamide melted at about 260° C. with decomposition.

*Example 28*

4 g. of β-methyl-β-butyrolactam were dissolved in 30 g. of o-dichlorobenzene and 5 g. of the solvent were distilled off under reduced pressure in order to remove any traces of moisture. 30 mg. of the sodium salt of α-pyrrolidone were then added as a catalyst. After the catalyst had been completely dissolved, the mixture was heated at 50° C. After a few minutes the polymer began to separate out. The temperature was maintained for 15 hours and the batch was then worked up by repeated boiling with acetone and drying at 75° C. in vacuo. 3.5 g. of a colorless polymer having a relative viscosity of 2.3 were obtained. When the product was heated in a melting-point tube it remained colorless even at a temperature above 250° C. and melted at about 280° C. with decomposition. The product was soluble in concentrated hydrochloric acid, concentrated formic acid, dichloroacetic acid, m-cresol and hot dimethyl sulfoxide.

*Example 29*

300 g. of β-methyl-β-butyrolactam were mixed with 700 g. of dimethyl sulfoxide. Within 1½ hours about 130 g. of the solvent were distilled off at a column under reduced pressure. The mixture was then cooled to 15 to 20° C. and 0.75 g. of pyrrolidone sodium was dissolved therein. The temperature was maintained constant by external cooling with water. After about 1½ hours the reaction mixture became markedly viscous, then turbid and soon the polymer separated out. The batch was allowed to stand for 3 days at room temperature, then for a further day at 50° C. and finally the product was worked up by mechanical comminution and repeated thorough boiling with water and acetone. 291 g. (97% of theoretical) of a polyamide having a relative viscosity of 6.1 were obtained.

The product so obtained was considerably superior to that described in Example 28; this fact was due in the first place to the favorable action of the solvent as could be ascertained by other tests. Dimethyl sulfoxide is a better solvent for the polyamide than dichlorobenzene so that the polymer separates out only at an advanced stage of the polymerization.

*Example 30*

10 mg. of sodium were dissolved in 30 cc. of absolute tertiary butanol and 4 g. of β-methyl-β-butyrolactam were added at boiling temperature (82° C.). After 3 to 4 minutes the polymer began to separate out. Heating was continued for another hour after which time the polyamide was isolated by addition of water, filtration and repeated extraction with hot water and acetone. The yield amounted to 1.2 g. and the relative viscosity to 1.3.

*Example 31*

45 g. of β-methyl-β-butyrolactam were suspended in 550 cc. of dry cyclohexane, while stirring vigorously, and 0.75 g. of finely pulverized sodium salt of α-pyrrolidone was then added. Within a few minutes a fine-grained polymer began to separate out. After 1 hour the precipitate was suction-filtered and air-dried. To remove monomeric lactam and low molecular portions the product was boiled four times with 500 cc. of water each, 10 cc. of 2N-hydrochloric acid being added to the first 500 cc. of water in order to neutralize the catalyst. The product was subsequently boiled twice with methanol and once with acetone. After drying at 75° C. in vacuo, the product had a weight of 43.5 g. and a relative viscosity of 1.7.

*Example 32*

A mixture of 10 g. of β-methyl-β-butyrolactam and 10 g. of α-pyrrolidone was heated for 1 hour at 90° C. under a reduced pressure of 15 millimeters of mercury, while dry air was sucked through. The mixture was then cooled to room temperature and 200 mg. of the sodium salt of α,α,β-trimethyl-β-butyrolactam were dissolved therein. At room temperature or moderately elevated temperature the polymerization occurred only slowly. When, however, the mixture was heated to 50° C., the highly exothermic reaction started abruptly, the internal temperature rising to 150 to 200° C. and a yellow very viscous resin being formed. In order to reduce discoloration during the polymerization to a minimum it proved advantageous to dissipate in the beginning part of the reaction heat by external cooling and to maintain the mixture for several hours at 50° C. The polyamide obtained was soluble in methanol and could be cast therefrom to yield well adhering coatings.

*Example 33*

A mixture of 10 g. of α,β-dimethyl-β-butyrolactam and 10 g. of α-pyrrolidone was polymerized in a manner analogous to that described in Example 32. The course of the reaction and the solubility of the polymer substantially corresponded to those described in Example 32, the polyamide obtained according to Example 33 was, however, somewhat harder.

*Example 34*

4 g. of α,β-dimethyl-β-butyrolactam were dissolved in 30 g. of dimethyl sulfoxide, 5 g. of the solvent were then distilled off under reduced pressure and 35 mg. of the sodium salt of α-pyrrolidone were finally added. The lactam substituted by 3 alkyl groups polymerized considerably more slowly when used alone than the other lactams which had been tested and which contained an α-methylene group. The batch was, therefore, kept for 14 days at 50° C. and then worked up with a great amount of hot water and then with acetone. 2.8 g. of a polyamide of a relative viscosity of 1.7 were isolated. The product melted at a temperature ranging from 274 to 277° C. and subsequently decomposed slowly. When the operation was carried out rapidly, brittle filaments could be drawn from the melt.

*Example 35*

4 g. of α,β-dimethyl-β-butyrolactam and 50 mg. of sodium-N-methyl-acetamide were dissolved in 20 cc. of absolute dimethyl sulfoxide and the solution was heated for 5 hours at 130° C. The solution remained liquid at that temperature and solidified on cooling to yield a jelly. After mechanical comminution, repeated boiling with water and acetone and drying in vacuo at 75° C., 3.3 g. of a colorless polymer melting at 272 to 274° C. were obtained. The product had a relative viscosity of 1.33.

*Example 36*

4 g. of β-ethyl-β-valerolactam were mixed with 30 cc. of dimethyl sulfoxide, 5 cc. of the solvent were distilled off, 60 mg. of the sodium salt of α-pyrrolidone were added and the whole was heated for 15 hours at 100° C. The polymer separated out in the form of a jelly. After repeated boiling with a great quantity of water, subsequent extraction with acetone and drying in vacuo at 75° C., 3.25 g. of a colorless pulverulent polyamide having a relative viscosity of 1.2 were obtained. The product melted at about 260° C. while turning brown.

*Example 37*

60 mg. of the sodium salt of α-pyrrolidone were dissolved in a mixture of 6 g. of β-methyl-β-caprolactam and 14 g. of dry benzene and the mixture was heated at 50° C. After a few hours a clear solution of the polyamide was obtained which could be directly cast to yield well adhering coatings. It seems noteworthy that the viscosity of this 30% solution increased relatively little during the polymerization although the degree of polymerization was sufficient for preparing filaments from the polyamide. Solutions of a higher concentration in easily volatile solvents could also be prepared without difficulty; they had the character of an adhesive substance.

*Example 38*

4 g. of β-phenyl-propiolactam were dissolved in 29 g. of dimethyl sulfoxide and 5 g. of the solvent were distilled off under a pressure of 15 millimeters of mercury. The mixture was then cooled to room temperature and 20 mg. of the sodium salt of α-pyrrolidone were dissolved therein. After a few seconds the beginning of the polymerization was indicated by an increase in the viscosity and shortly thereafter the whole batch solidified to yield a jelly. To complete the reaction, the batch was heated at 50° C. for 15 hours. By mechanical comminution, repeated boiling with water, methanol and acetone and drying in vacuo at 75° C. the polymer was freed from unreacted monomer, lower-polymeric portions and solvent. 3.75 g. of polyamide having a relative viscosity of 32.9 were obtained. On heating in a melting point tube, the product began to undergo discoloration at a temperature of 300° C. and decomposed without melting at 310 to 320° C. It was considerably swollen by cold formic acid and m-cresol and hot dimethyl formamide, N-methyl pyrrolidone and tetramethylene sulfone and yielded clear solutions in dimethyl sulfoxide at a temperature above 140 to 150° C. The solutions could be worked up into films and filaments which could be stretched to a multiple of their length at a temperature above 200° C. When the polymerization was carried out under corresponding conditions in o-dichlorobenzene, a polyamide of a relative viscosity of 5.9 was obtained in a smooth reaction in a good yield. Similar results were obtained with polymerization batches in dimethyl formamide or N-methyl-pyrrolidone.

*Example 39*

3 g. of β-phenyl-propiolactam were dissolved in 80 cc. of absolute methylene chloride and 80 mg. of the sodium salt of α,α,β-trimethyl-β-butyrolactam were added. A few seconds after the addition of the catalyst, the polymer began to separate out. To complete the reaction, the whole was heated for 2 hours at the boil, cooled, and the precipitate was repeatedly thoroughly extracted with acetone. After drying in vacuo at 75° C., 2.8 g. of polyamide having a relative viscosity of 6.1 were obtained.

*Example 40*

2 g. of β-phenyl-propiolactam were dissolved in 30 cc. of dry o-dichlorobenzene and 0.2 cc. of an ethereal solution containing 0.03 g. of phenyl magnesium bromide was added. The whole was heated for 20 hours at 50° C. and the polyamide was subsequently isolated by suction filtration and repeated boiling with acetone. The yield amounted to 1.95 grams; the relative viscosity of the 1% solution in sulfuric acid was 1.2.

*Example 41*

2 g. of β-phenyl-propiolactam were dissolved in 25 cc. of dry dimethylformamide and 40 mg. of an aqueous potassium hydroxide solution saturated at room temperature were added. Within a few minutes the whole batch solidified. After a reaction of 4 hours at 50° C. the product was worked up in the manner described above. 1.7 g. of a polyamide of a relative viscosity of 3.76 were obtained.

*Example 42*

10 mg. of sodium were dissolved in 40 cc. of absolute secondary butanol, 2 g. of β-phenyl-propiolactam were added and the solution was heated for 65 hours at 50° C. After a very short time the polyamide began to separate out. The product was isolated in usual manner with hot water and acetone. 1.6 g. of a polymer having a relative viscosity of 1.3 were obtained.

*Example 43*

2 g. of β-phenyl-propiolactam were dissolved in 40 cc. of dry dimethyl sulfoxide and 200 mg. of finely powdered anhydrous sodium carbonate were added. The mixture was heated for 6 hours at 100° C., while stirring vigorously. At that temperature the resulting polyamide still remained dissolved as a clear solution; on cooling it began to separate out at a temperature of about 70° C. and less. After working up as usual 0.5 g. of a polymer of a relative viscosity of 2.20 was obtained.

*Example 44*

A solution of 2 g. of β-phenyl-propiolactam and 30 mg. of trimethyl-benzyl-ammonium-hydroxide in 20 cc. of dimethyl sulfoxide was heated for 24 hours at 50° C. 1.55 g. of a polyamide of a relative viscosity of 2.27 was obtained.

*Example 45*

50 mg. of finely powdered barium-hydroxide-octa-hydrate was added to 30 cc. of dimethyl sulfoxide and 5 cc. of the solvent was distilled off under reduced pressure. 1.5 g. of β-phenyl-propiolactam was dissolved in this mixture and the whole was heated for 5 minutes to 80° C., while shaking vigorously. Already after this short time a gel of the polymer had formed which was freed from the catalyst by treatment with dilute hydrochloric acid and purified by repeated boiling with water and acetone. The yield amounted to 0.95 g. and the viscosity was 18.2.

*Example 46*

2 g. of β-phenyl-propiolactam and 20 mg. of sodium-methylacetamide was dissolved in 25 cc. of freshly distilled aniline and heated for 66 hours at 50° C. Within a few minutes the bulk of the polymer separated out.

The product was isolated by dilution with acetone, filtration and repeated treatment with hot dilute hydrochloric acid and water. The product was dried in vacuo at 75° C. The yield amounted to 1.7 g. and the relative viscosity was 2.6.

*Example 47*

10 mg. of sodium-methyl-acetamide was added to a boiling solution of 1 g. of β-phenyl-propiolactam in 25 cc. of tertiary butylamine. Within a few seconds the polyamide began to precipitate. The batch was boiled for a total of 2 hours and the polymer was then isolated by suction filtration and repeated treatment with hot water, dilute hydrochloric acid and acetone. By drying in vacuo at 75° C. 0.85 g. of a polyamide having a relative viscosity of 2.49 was obtained.

When β-methyl-β-butyrolactam was polymerized in the same solvent under identical conditions, the corresponding polyamide having a relative viscosity of 1.6 was obtained in a somewhat slower reaction in a 70% yield.

*Example 48*

2 g. of α,β-dimethyl-β-butyrolactam and 0.3 g. of bis-β-lactam from dipentene was dissolved in 15 cc. of dimethyl sulfoxide, 3 cc. of the solvent was distilled off under reduced pressure, 30 mg. of the sodium salt of α-pyrrolidone was added and the clear solution was heated for 1 hour at 120° C. After about 10 minutes the whole batch had solidified to form a gel-like mass. The latter was mechanically comminuted, boiled four times with 200 cc. of water each and dried in vacuo at 75° C. The yield amounted to 2.2 g. On heating the product began to soften at a temperature of about 200 to 230° C., followed by discoloration beginning at about 260° C. and decomposition at about 300° C. without melting.

Contrary to the homopolymer of α,β-dimethyl-β-butyrolactam (cf. Examples 34 and 35) which yielded clear solutions with formic acid, concentrated sulfuric acid, m-cresol and trifluoroethanol, the copolymer obtained according to Example 48 was swollen by the aforesaid solvents but not dissolved therein.

*Example 49*

1.5 g. of β,δ,δ-trimethyl-β-caprolactam to which 60 mg. of the sodium salt of α-pyrrolidone had been added were heated for 1 hour at 140° C. Within a few minutes a very thickly liquid melt formed which solidified on cooling to yield a brittle colorless mass. The latter was comminuted, repeatedly extracted with petroleum ether in which the monomeric lactam is readily soluble, while the polyamide dissolves only sparingly therein. The mass was then extracted with dilute hydrochloric acid, washed several times with water and finally dried in vacuo at 75° C. The polyamide was obtained in a substantially quantitative yield. It had a relative viscosity of 1.07. The product began to soften at about 130° C. and yielded a clear melt at 140 to 150° C. It was well soluble in most organic solvents.

When a solvent was used in the polymerization, the latter proceeded considerably more slowly. A batch of 1.5 grams of lactam, 5 cc. of m-xylene and 10 mg. of sodium (the sodium dissolved very rapidly at elevated temperatures with evolution of hydrogen) had, for example, to be boiled for several hours in order to achieve a substantially quantitative polymerization. The polyamide remained in the form of a clear solution and could be isolated in substance only by evaporation of the solvent.

*Example 50*

Air which had been dried over phosphorus pentoxide was sucked at 105° C. under a reduced pressure of 15 millimeters of mercury for 1½ hours through a mixture of 120 g. of β-methyl-β-butyrolactam and 60 g. of β-methyl-β-caprolactam. The mixture was then cooled to 11 to 12° C., 0.18 g. of the sodium salt of α-pyrrolidone was dissolved therein and the whole was allowed to polymerize in vacuo at the indicated temperature with continuous external cooling.

After several hours a marked increase of the viscosity could be observed and after about 15 hours the mass had become immovable. The batch was reacted for a total of 30 hours at that temperature and the temperature was then slowly raised to 90° C. in the course of 48 hours with continuous evacuation. A solid block of a water-white, hard and very elastic resin was obtained. The relative viscosity was 4.2. The product was soluble in methanol and some other organic solvents. The polymerization was highly exothermic.

If the external cooling is insufficient in the beginning, the reaction velocity increases and finally can no longer be controlled whereby the quality of the product is impaired.

*Example 51*

12 g. of β-phenyl-propiolactam and 3 g. of β-(4-chlorophenyl)-propiolactam were dissolved in 75 g. of dimethyl sulfoxide, 15 g. of the solvent were distilled off, the mixture was cooled to 15° C. and 60 mg. of the sodium salt of α-pyrrolidone were added, while shaking vigorously. Within a few seconds the whole batch solidified to yield a viscous jelly. By working up in usual manner 14.6 g. of a polymer of a relative viscosity of 118 were obtained. The product began to undergo discoloration at a temperature of about 300° C. and melted at 310 to 320° C. with decomposition. It contained 4.1% of chlorine. For a copolymer of the above-mentioned composition 3.9% were calculated.

*Example 52*

5 g. of β-(4-tolyl)-propiolactam were dissolved in 30 g. of dimethyl sulfoxide. 8 g. of the solvent were distilled off and after cooling to room temperature 40 mg. of the sodium salt of α-pyrrolidone were added. After 5 hours the batch was worked up as usual. 4.3 g. of a polymer of a relative viscosity of 5.7 were obtained. The product began to undergo discoloration at a temperature of about 310° C. and decomposed at about 330° C.

*Example 53*

4 g. of β-phenyl-propiolactam were dissolved in 30 g. of dimethyl sulfoxide, 3 g. of the solvent were distilled off, 26 mg. of the sodium salt of α,α,β-trimethyl-β-butyrolactam were dissolved in the residue at 50° C. and the batch was kept for 165 minutes at that temperature. The polyamide isolated in usual manner had a relative viscosity of 13.5.

When 21, 54 and 160 mg., respectively, of glycol monomethyl ether were added as chain terminator prior to the addition of the catalyst, while otherwise proceeding as described above, products of a relative viscosity of 6.9, 4.6 and 2.4, respectively, were obtained.

*Example 54*

Of a solution of 315 g. of β-methyl-β-butyrolactam, 35 g. of β-methyl-β-caprolactam and 0.35 g. of a bis-lactam obtained by addition of two molecules of chlorosulfonyl isocyanate to dipentene and reductive splitting off of the chlorosulfonyl groups, in 650 g. of dimethyl sulfoxide 100 g. were distilled off at a column under reduced pressure. The distillate substantially consisted of dimethyl sulfoxide and contained only very small amounts of the somewhat less volatile lactams. The residue was cooled to room temperature and 0.8 g. of pyrrolidone sodium was dissolved therein. After about 3 hours the solution became highly viscous and finally solidified to form a gel-like mass, without the polymer being previously separated. This already shows the difference between the polymerization according to this example and that described in Example 2 according to which pure β-methyl-β-butyrolactam without a second monomer component was used. The batch was allowed to stand for 120 hours at room temperature, then heated for 48 hours at 50° C. and finally worked up as usual. 341 g. of a polymer of a relative viscosity of 14.0 were obtained.

The addition of the feeble quantity of bis-lactam to the polymerization batch already caused a marked increase in length of polymer chains whereas a pronounced cross-linking action leading to tridimensional polymers could not be observed.

Foils which had been prepared from solutions of the copolymer in trifluorethanol could be stretched to a multiple of their length at a temperature above about 150° C. At a temperature of about 200° C. and more the product could be shaped under pressure to form transparent articles.

We claim:

1. Linear, fiber-forming polyamides consisting essentially of polymerized β-mono-amino-monocarboxylic acids containing at least 4 and not more than 14 carbon atoms, said polyamides having two hydrogen atoms in the α-position to the carbonyl group, being unsubstituted at the nitrogen atom, and having a relative viscosity of 1.5 to 500, measured as a 1 percent solution in concentrated sulfuric acid at 20° C.

2. Linear, fiber-forming polyamides consisting essentially of polymerized β-methyl-β-amino butyric acid, said polyamides having a relative viscosity of from 2 to 20 measured as a 1 percent solution in concentrated sulfuric acid at 20° C.

3. Linear, fiber-forming copolyamides consisting essentially of from 80 to 99.9 percent by weight of β-methyl-β-amino-butyric acid and 0.1 to 20 percent by weight of β-methyl-β-amino caproic acid, said polyamides having a relative viscosity of from 2 to 20 measured as a 1 percent solution in concentrated sulfuric acid at 20° C.

4. Process for the manufacture of polymeric materials, which comprises contacting at least one lactam of a β-mono-amino-monocarboxylic acid containing at least 4 and not more than 14 carbon atoms, which lactam is unsubstituted at the nitrogen atom and contains at least one hydrogen atom in the α-position to the carbonyl group, with 0.01 to 10 mol percent, calculated on the monomer used, of lactamate of a strong base of the order of strength of the hydroxides of the alkali metals and alkaline earth metals, said lactamate corresponding to the lactam to be polymerized, until a polymer is obtained.

5. The process of claim 4, wherein said lactamate is a lactamate selected from the group consisting of sodium, potassium, lithium, calcium, barium, and magnesium lactamates.

6. The process of claim 4, wherein said lactamate is a lactamate of a quaternary ammonium compound.

7. The process of claim 4, wherein said lactam contains two hydrogen atoms in the α-position to the carbonyl group and is substituted at the β-carbon atom by two alkyl groups containing together 2 to 6 carbon atoms.

8. The process of claim 4, wherein said lactam contains two hydrogen atoms in the α-position to the carbonyl group and the β-carbon atom of said lactam is simultaneously a member of an alicyclic ring with 4 to 6 carbon atoms.

9. The process of claim 4, wherein β-lactams are used which carry in the β-position a phenyl radical.

10. The process of claim 4, wherein β-lactams are used which carry in the β-position a phenyl radical substituted by halogen.

11. The process of claim 4, wherein β-lactams are used which carry in the β-position a phenyl radical substituted by lower alkyl groups containing 1 to 3 carbon atoms.

12. The process of claim 4, wherein β-methyl-β-butyrolactam is subjected to polymerization.

13. The process of claim 4, wherein β-methyl-β-caprolactam is subjected to polymerization.

14. The process of claim 4, wherein β-phenyl-β-propiolactam is subjected to polymerization.

15. The process of claim 4, wherein at least two β-lactams substituted by aliphatic groups of different length and each having between 1 and 5 carbon atoms are copolymerized.

16. The process of claim 4, wherein a mixture of from 50 to 99.9 percent by weight β-methyl-β-butyro-lactam and 0.1 to 50 percent β-methyl-β-caprolactam is polymerized.

17. The process of claim 4, wherein at least two β-lactams substituted by aromatic groups of different equivalent weight are copolymerized.

18. The process of claim 4, wherein the polymerization is carried out in the presence of inert diluents, which themselves do not react under the polymerization conditions.

19. The process of claim 4, wherein the polymerization is carried out in the presence of inert solvents which themselves do not react under the polymerization conditions and which are capable of dissolving, at elevated temperatures, the polyamide formed.

20. The process of claim 19, wherein dimethyl sulfoxide is used as inert solvent.

21. The process of claim 4, wherein the polymerization is carried out in the presence of 0.1 to 5 mol percent of lactamate, calculated on the monomer used.

22. The process of claim 4, wherein the molecular weight of the polyamide formed is regulated by addition of chain-terminating substances containing active hydrogen atoms capable of being exchanged for metal ions.

23. The process of claim 4, wherein lactams in contact with a lactamate are temporarily stabilized against polymerization by the addition of an agent retarding the polymerization, and polymerization is then initiated by evaporating the stabilizer.

24. The process of claim 4, wherein the polymerization is carried out on textiles.

25. Process for the manufacture of polymeric materials, which comprises copolymerizing with α-pyrrolidone at least one lactam of a β-mono-amino-monocarboxylic acid containing at least 4 and not more than 14 carbon atoms, which lactam is unsubstituted at the nitrogen atom and contains at least one hydrogen atom in the α-position to the carbonyl group and is substituted at the β-carbon atom by two alkyl groups containing together from 2 to 6 carbon atoms.

26. The process of claim 25, wherein from 50 to 99.9 percent of β-methyl-β-butyrolactam is copolymerized with from 0.1 to 50 percent by weight of α-pyrrolidone.

References Cited in the file of this patent

UNITED STATES PATENTS

| | | |
|---|---|---|
| 2,333,752 | Ufer | Nov. 9, 1943 |
| 2,356,516 | Hagedorn | Aug. 22, 1944 |
| 2,500,317 | Lincoln | Mar. 14, 1950 |
| 2,809,958 | Barnes et al. | Oct. 15, 1957 |

FOREIGN PATENTS

| | | |
|---|---|---|
| 112,074 | Australia | June 11, 1939 |